United States Patent [19]

Diehl et al.

[11] Patent Number: 5,162,638
[45] Date of Patent: Nov. 10, 1992

[54] PROCESS FOR PROTECTION AGAINST FRAUDULENT USE OF SMART CARDS, AND DEVICE FOR USE OF THE PROCESS

[75] Inventors: Eric Diehl, Neudorf; Joël Hamon, Lipsheim; Michel Leduc, Boersch, all of France

[73] Assignee: Laboratoire Europeen De Recherches Electroniques Avancees, Societe En Nom Collectif, Courbevoie, France

[21] Appl. No.: 606,859

[22] Filed: Oct. 31, 1990

[30] Foreign Application Priority Data

Nov. 3, 1989 [FR] France ................................ 89 14414

[51] Int. Cl.⁵ .......................... G06K 5/00; G06F 15/20; G07D 7/00
[52] U.S. Cl. ................................ 235/380; 235/375; 235/382; 340/825.310; 340/825.340
[58] Field of Search ............... 235/380, 375, 382, 492; 283/70, 74, 75, 904; 340/825.31, 825.34; 380/23, 24, 25

[56] References Cited

U.S. PATENT DOCUMENTS

| 4,367,402 | 1/1983 | Giraud et al. | 235/385 |
| 4,605,846 | 8/1986 | Duret et al. | 235/456 |
| 4,752,678 | 6/1988 | Rikuna | 235/380 |
| 4,758,718 | 7/1988 | Fujisaki et al. | 235/380 |
| 4,777,354 | 10/1988 | Thomas | 235/380 |
| 4,851,650 | 7/1989 | Kitade | 235/380 |
| 4,891,503 | 1/1990 | Jewell | 235/380 |
| 4,947,027 | 8/1990 | Golightly | 235/380 |

FOREIGN PATENT DOCUMENTS 2534712 4/1984 France .
8604170 7/1986 World Int. Prop. O. .

*Primary Examiner*—John W. Shepperd
*Assistant Examiner*—Tan Nguyen
*Attorney, Agent, or Firm*—Oblon, Spivak, McClelland, Maier & Neustadt

[57] ABSTRACT

To prevent a person having found or stolen a card of a pay-television subscriber from using it fraudulently, the identity of the subscriber is recorded in a zone protected from reading and writing. At the beginning of the period of use of a new card, the new card compares the identity of the new card with that of the old one, and delivers the password only if the two identities are the same.

4 Claims, 1 Drawing Sheet

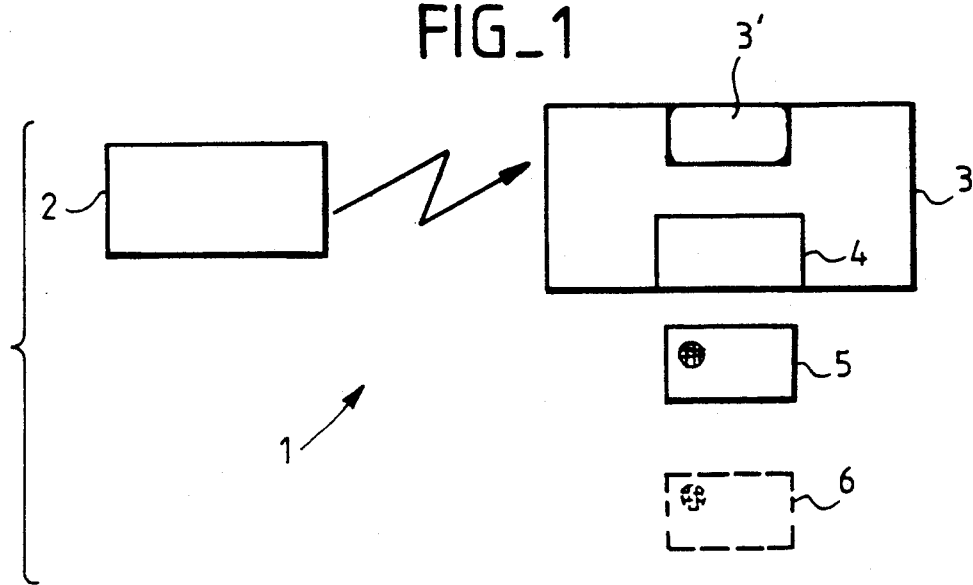
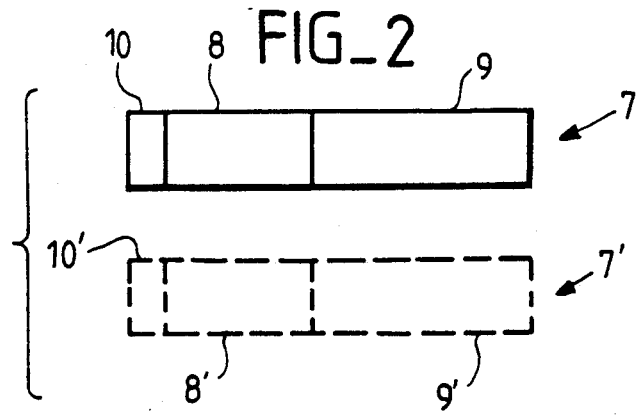

PROCESS FOR PROTECTION AGAINST FRAUDULENT USE OF SMART CARDS, AND DEVICE FOR USE OF THE PROCESS

BACKGROUND OF THE INVENTION

The present invention concerns a process for protection against the fraudulent use of smart cards, and a device for the use of this process.

Certain pay-television networks require the use of smart cards as means of payment for the services provided.

These cards can be lost by their owners, or they can be stolen. In general, these cards have a validity of only a few months, in order to limit these risks, as well as the risks of counterfeiting. Nevertheless, if the card is lost or stolen, the person who comes into possession of the card can use it fraudulently, and at the end of the period of validity can, if he or she has enough technical knowledge, simulate the signal sent by the card reader to inform the program emitter that the card used is still valid.

The object of the present invention is a process to prevent an unauthorized person from using a smart card in a system, in particular a system for surveillance or distribution of goods or services, after the end of the period of validity of this card. Another object of the present invention is a device for the use of this process.

SUMMARY OF THE INVENTION

The process of the present invention consists in assigning an identity to each user and memorizing it in the cards delivered to this user, and checking at the end of the period of validity of a smart card, when it is renewed, that the new card has the same identity as the previous one.

According to an aspect of the process of the invention, at least one field is reserved in the cards in which are memorized unique data relative to the identity of the user, and it is verified that when the user puts a new card into service, this field of the new card is identical to that of the old card.

The device of the invention is a network, in particular for the distribution of goods or services, comprising at least one management center or emitter and at least one terminal, in which the terminal possesses means of memorizing the coded content of a given field of a smart card used in a given terminal, and means of transmitting this memorized content to a second card.

BRIEF DESCRIPTION OF THE DRAWINGS

The present invention will be better understood on reading the detailed description of a mode of embodiment, taken as a non-restrictive example and illustrated by the appended drawing in which:

FIG. 1 is a simplified block diagram of a network according to the invention, and FIG. 2 is a diagram of the identification field of a smart card used in the network represented in FIG. 1.

DESCRIPTION OF THE PREFERRED EMBODIMENT

The invention is described below with reference to a pay-television network, but it is understood that it is not restricted to this application, and can be used in any network such as a surveillance network for goods or persons or a network for the distribution of goods or services (banknotes, theater tickets, gasoline, recording cash tills in shops, etc.). Such a network has at least one management center (or server) or an emitter, and at least one appropriate terminal which may be close to or distant from the management center or emitter, this terminal being equipped with means to cooperate with smart cards.

The pay-television network 1 in FIG. 1 comprises an emitter 2 and several receivers. To simplify the drawing, a single receiver, 3, has been represented.

This receiver 3 includes a display device 3′, which can be the screen of this receiver. In the receiver 3 only the device necessary for the description of the invention has been shown, which is a smart card reader 4. These cards, in addition to their usual circuits, can possess burnable junctions ("tokens") representing a program credit, which are burnt out as the card is used up.

In FIG. 1 has been represented a first card 5 (in solid lines) which represents the card whose period of validity has just ended, and a second card 6 (in dashed lines) representing the new card for the following period of validity.

The cards 5, 6 usually include several data fields in the section of their memory where reading and writing are inhibited. These secret data are for example the card identification number, the user's bank account number and credit limit, an encryption algorithm, etc.

One of these sections is represented in FIG. 2, and referenced 7 for the card 5 and 7′ for the card 6. This section 7 (7′) is reserved for card identification data; it has two fields 8, 9 (for the card 5) and 8′, 9′ (for the card 6). The field 8 (8′) comprises data representing validity parameters (period of validity, etc.) or personalization of the subscription for which the card is valid (type of program, duration, etc.). The field 9, 9′ contains a code identifying the card and/or the owner.

Moreover, the section 7, 7′ contains a field 10, 10′ which contains, in the present example, a single bit. This field 10, 10′ is not necessarily contiguous to the fields 8, 9 or 8′, 9′. The bit in field 10, 10′ is initially a zero. The emitter 2 verifies that when a new card 6 is put into the reader 4 at the beginning of a new period of validity, the bit in field 10′ is in fact a zero. If it is, the emitter 2 asks the user (display in 3′) to put the old card 5 into the reader 4 in order to read and memorize its field 9, and then asks the user to put the card 6 back into the reader 4, and transmits the field 9 to the card 6. If the card 6 finds that these two fields are identical, the card 6 allows the decoder of the reader 4 to record a "1" in 10′ and can then operate normally, i.e. it delivers the password to the receiver 3 to enable it to unscramble scrambled programs, during the whole of the period of validity of the card 6. Otherwise, the reader causes a non-valid card message to be displayed in 3′, and the card cannot send the password and can be definitively disabled. Thus, according to the present invention the encoded identity of the old card 5 is temporarily memorized in the reader 4 (where it is accessible from outside, but as it is encoded in accordance with the concept of "zero knowledge", this identity cannot be recovered), and then transmitted to the new card 6. The identity of the new card can be transferred to the reader 4 only if this card has been validated and thus recognized as good.

It will be noted that if the user changes the card while the receiver 3 is in operation, the receiver keeps the value of the field 9 of the card 5 in its memory, and when the user removes the card 5 to replace it by the card 6, this card 6 is initialized (a "1" is written in the field 10') automatically if it is valid, that is if the content of its field 9' is identical with the content of the field 9 of the card 5.

According to a variant of the invention, an extra field can be provided in section 7, 7' with a code number known only by the legitimate user, who must input this number before initializing a new card.

Thus, according to the present invention, the authorization for use of a new card is independent of the acquisition of the password, for a pay-television network.

What is claimed is:

1. A process for validating a new smart card after an end of period of validity of an old smart card in a system of distribution of one of goods and services, wherein said system includes at least one management center and at least one terminal connected to said center, said process comprising the steps of:

assigning an identity to each user which identity is memorized in at least two cards sent to said user; and verifying at the end of the period of validity of said old card that a new card has the same identity as said old card, wherein said terminal reading and transmitting the identity of said old card to said new card which is inserted into said terminal after said old card has been withdrawn from said terminal; and at least one field is reserved in the cards for memorization of unique data relative to the identity of the user and wherein it is checked in said cards that when the users start to use said new card, said field of the new card is identical to that of the old card.

2. A process for validating a new smart card after an end of period of validity of an old smart card in a system of distribution of one of goods and services, wherein said system includes at least one management center and at least one terminal connected to said center, said process comprising the steps of:

assigning an identity to each user which identity is memorized in at least two cards sent to said user; and verifying at the end of the period of validity of said old card that a new card has the same identity as said old card, wherein said terminal reading and transmitting the identity of said old card to said new card which is inserted into said terminal after said old card has been withdrawn from said terminal; and during the renewal of a card account, it is verified that the new card has not previously been initialized.

3. Process according to claim 2, wherein the initialization of a card, after it has been checked that the user possesses a previous card and a new card with the same identity, consists in irreversibly modifying a secret datum in the new card.

4. A process for validating a new smart card after an end of period of validity of an old smart card in a system of distribution of one of goods and services, wherein said system includes at least one management center and at least one terminal connected to said center, said process comprising the steps of:

assigning an identity to each user which identity is memorized in at least two cards sent to said user; and verifying at the end of the period of validity of said old card that a new card has the same identity as said old card, wherein said terminal reading and transmitting the identity of said old card to said new card which is inserted into said terminal after said old card has been withdrawn from said terminal; and on first use of a new card, the user must input a secret code number.

* * * * *